Jan. 19, 1932.  F. J. GIVEN  1,841,472

INDUCTANCE DEVICE

Filed Aug. 26, 1930

INVENTOR
F. J. GIVEN
BY *J. A. Burgess*
ATTORNEY

Patented Jan. 19, 1932

1,841,472

UNITED STATES PATENT OFFICE

FREDERICK J. GIVEN, OF EAST ORANGE, NEW JERSEY, ASSIGNOR TO BELL TELEPHONE LABORATORIES, INCORPORATED, OF NEW YORK, N. Y., A CORPORATION OF NEW YORK

INDUCTANCE DEVICE

Application filed August 26, 1930. Serial No. 477,850.

This invention relates to adjustable inductances and more particularly to toroidal coils, the inductances of which may be varied.

The advantage of toroidal shaped coils, such as small external field, adaptability to the use of magnetic material, etc., are well known. However, the use of toroidal coils in situations where variable inductance is required or a fixed inductance of accurate value, has been somewhat limited because toroidal coils have been found to be difficult of adjustment as to their inductance. Various expedients have been tried with varying success.

An idea of the accuracy required by coils of this type when used, for example, in wave filters, may be obtained when it is realized that merely impregnating such a coil with a preservative material and placing the impregnated coil in a container may vary its inductance to such an extent as to prevent obtaining inductance values of the precision required by the characteristic of the wave filter. Other elements of the wave filter also have an appreciable effect upon the effective inductance of a coil, which effect it is practically impossible to predetermine and consequently cannot be allowed for during manufacture. On this account some method of making extremely accurate adjustments of the inductance of the coil after impregnation, potting and assembly in the filter is essential to provide accurate wave filters.

An object of this invention is to enable the inductance of a toroidal inductance coil to be varied and accurately adjusted.

Another object of the invention is to facilitate the adjustment of such coils after they have been permanently encased.

Figure 1:
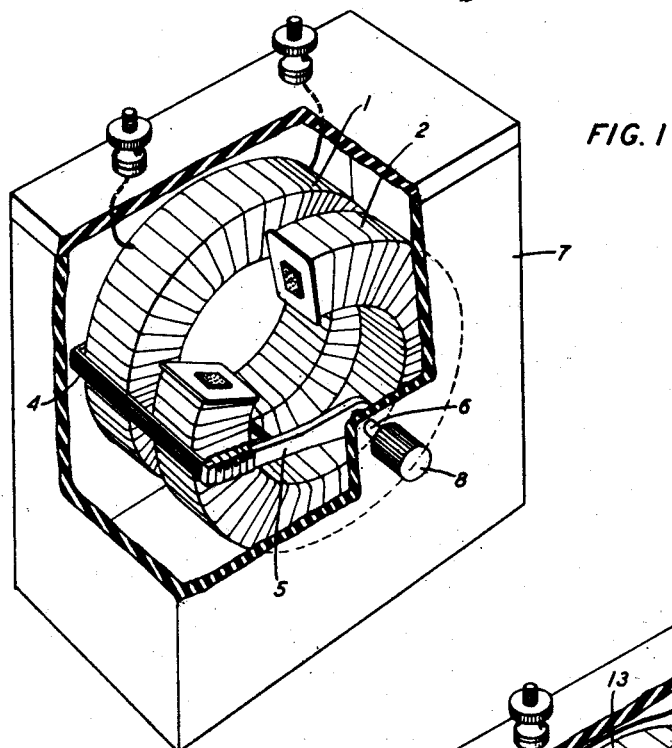
Figure 2:
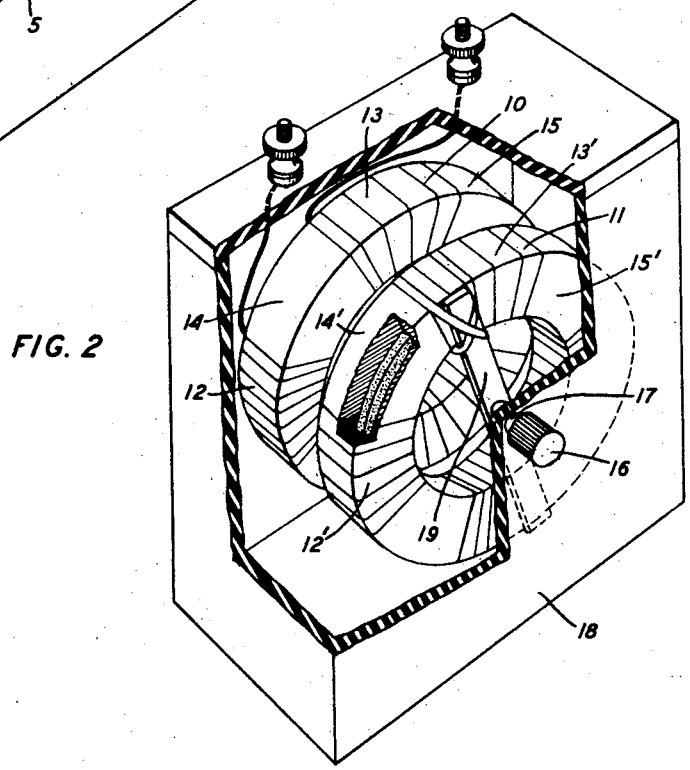

The invention will be better understood from the following description together with the attached drawings forming a part thereof in which Fig. 1 illustrates one form which the invention may take; and Fig. 2 illustrates another manner of utilizing the invention.

Referring now to Fig. 1, a toroidal coil which may be a part of a wave filter has associated with it and in a plane parallel thereto, another toroidal coil 2 provided with an air-gap as indicated.

Coil 2 preferably comprises a plurality of short circuited turns. In most applications both coils 1 and 2 have magnetic material cores. However, such cores are not essential and the invention also includes coreless coils or coils having cores of non-magnetic material.

A magnetic material member 4 is arranged so that it embraces both coils 1 and 2. This member may be in the form of a loop and may comprise one or a plurality of turns of preferably magnetic material.

Loop 4 is supported by a rod 5 which is securely attached to the shaft 6 which passes through casing 7 and has a knob 8 fixed to it at its outer end. By turning knob 8 loop 4 is caused to change position relative to the gap in coil 2. Obviously, if it is desired, a similar arrangement, as to knob 8, etc., may be used to move coil 2 whereby the relative positions of loop 4 and the gap in coil 2 are changed.

As is well known there is a certain amount of leakage of magnetic flux from coil 1 which embraces coil 2, this leakage of flux is somewhat aided by loop 4 and the linkage of magnetic lines is increased in the proximity of loop 4.

As the relative positions of the gap and loop 4 change, there will be more or less linkage of magnetic lines and the mutual inductance between coils 1 and 2 will vary. As the mutual inductance varies the self-inductance of coil 1 varies and the inductance of coil 1 may be adjusted to its desired value.

A somewhat similar arrangement in which one coil is moved relatively to the other, while maintaining parallel positions, is shown in Fig. 2. In this embodiment of the invention two toroidal shaped coils 10 and 11 are provided with "lumped" windings, that is, the windings are not uniform.

The windings of the coils are mounted at 12—13, 12'—13', etc. while insulated spacing pieces are mounted between the windings at 14—15, 14'—15', etc. The windings 12—13, etc. may be part of a continuous or single winding or they may be independent windings. The winding 12'—13', etc. may be parts of a single short circuited winding or they may be independent short circuited windings.

Coil 11 is arranged to be moved about its axis perpendicular to its main plane while the main plane of the coil remains parallel to that of coil 10. The mechanical arrangement for accomplishing this movement is similar to that of Fig. 1 for moving the loop and consists of a knob 16, the shaft 17 of which passes through casing 18 and has fastened to it on its inner end a rod 19 which is permanently fastened in any convenient manner to coil 11.

Here again the magnetic flux leakage between coils 10 and 11 is utilized to vary the inductance of coil 10. When knob 16 is turned, together with coil 11, the relative positions of windings 12—12', 13—13', are changed with the accompanying change in inductance of coil 10 due to changed magnetic linkage. In this manner the inductance of coil 10 is adjusted to the value desired.

Obviously it is immaterial which coil 10 or 11 is moved since it is merely the change in the relative positions of the windings which causes the change in inductance of the coil.

What is claimed is:

1. In an inductance device, a toroidal coil, a second torodial coil having short circuited windings said second coil being in a plane parallel to said first coil and means to vary the linkage of magnetic flux lines between said coils while maintaining said coils in parallel planes.

2. In an inductance device, a toroidal coil, a second toroidal coil having short circuited windings in a plane parallel to said first coil, a gap in said second coil and means to vary the linkage of magnetic flux lines in proximity to said gap while maintaining said coils in parallel planes.

3. An inductance device comprising a toroidal coil, a second toroidal coil having short circuited windings in a plane parallel to that of said first coil, a gap in said second coil, a magnetic material loop embracing both said coils and means to vary the position of said loop relative to said gap.

4. An inductance device comprising a toroidal coil having lumped windings, a second toroidal coil having its main plane parallel to that of said first coil and also provided with lumped windings and means to vary the linkage of magnetic flux between the windings on said coils.

5. An inductance device comprising a toroidal coil having lumped windings, a second toroidal coil having its main coil parallel to that of said first coil and also provided with lumped windings and means to vary the relative positions of said lumped windings of said coils while maintaining said coils in parallel planes.

6. An inductance device comprising a toroidal coil having lumped windings, a second toroidal coil having its main plane parallel to that of said first coil and also provided with lumped windings, said windings on said second coil being short circuited and means to vary the relative positions of said lumped windings of said coils while maintaining said coils in parallel planes.

In witness whereof, I hereunto subscribe my name this 20 day of August, 1930.

FREDERICK J. GIVEN.